US012782610B2

(12) United States Patent
Li et al.

(10) Patent No.: US 12,782,610 B2
(45) Date of Patent: Nov. 3, 2026

(54) PLANAR MICRO-NANO OPTICAL ANALOG COMPUTING DEVICE

(71) Applicant: CHANGCHUN INSTITUTE OF OPTICS, FINE MECHANICS AND PHYSICS, CHINESE ACADEMY OF SCIENCES, Changchun (CN)

(72) Inventors: Wei Li, Changchun (CN); Chunqi Jin, Changchun (CN); Chen Huang, Changchun (CN); Sandeep Kumar Chamoli, Changchun (CN)

(73) Assignee: CHANGCHUNINSTITUTE OF OPTICS, FINE MECHANICS AND PHYSICS, CHINESE ACADEMYOF SCIENCES, Changchun (CN)

( * ) Notice: Subject to any disclaimer, the term of this patent is extended or adjusted under 35 U.S.C. 154(b) by 196 days.

(21) Appl. No.: 18/949,717

(22) Filed: Nov. 15, 2024

(65) Prior Publication Data

US 2025/0076546 A1 Mar. 6, 2025

Related U.S. Application Data

(63) Continuation of application No. PCT/CN2024/076567, filed on Feb. 7, 2024.

(30) Foreign Application Priority Data

Aug. 3, 2023 (CN) ........................ 202310969227.6

(51) Int. Cl.
*G02B 5/00* (2006.01)
*G06E 3/00* (2006.01)

(52) U.S. Cl.
CPC ............... *G02B 5/00* (2013.01); *G06E 3/001* (2013.01)

(58) Field of Classification Search
CPC .................................. G02B 5/00; G06E 3/001
USPC .......................................................... 359/230
See application file for complete search history.

(56) References Cited

U.S. PATENT DOCUMENTS

2020/0284960 A1 9/2020 Ellenbogen et al.

FOREIGN PATENT DOCUMENTS

CN 113156642 A 7/2021
CN 115061277 A 9/2022

*Primary Examiner* — David Y Chung
(74) *Attorney, Agent, or Firm* — George D. Morgan

(57) ABSTRACT

The present invention relates to the technical field of optical analog computing, and specifically provides a planar micro-nano optical analog computing device. A planar micro-nano optical element includes a micro-nano structure. By adjusting a physical parameter of the micro-nano structure, the planar micro-nano optical element corresponds to different transfer functions at different resonance wavelengths, and a relationship curve between the transfer function and an incident wave vector at different resonance wavelengths is rectangle bandpass filtering functions with different bandwidths. According to the present invention, based on the planar micro-nano optical element, required transfer functions at different wavelengths are designed, so that a wavelength-controlled two-dimensional multi-channel image optical analog computing device with a high numerical aperture and insensitive polarization can be implemented, and differential image processing can be performed on target objects with different structural sizes selectively.

8 Claims, 6 Drawing Sheets

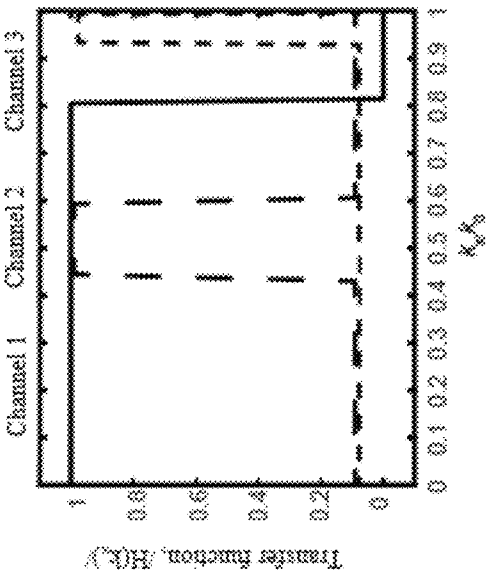
FIG. 1
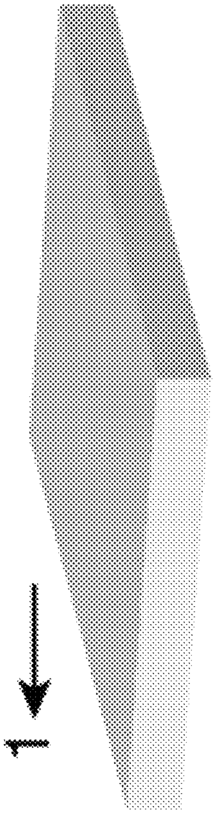

PLANAR MICRO-NANO OPTICAL ANALOG COMPUTING DEVICE

CROSS REFERENCE TO RELATED APPLICATIONS

The present application claims priority to Chinese Patent Application No. 202310969227.6, filed with the China National Intellectual Property Administration on Aug. 3, 2023 and entitled "PLANAR MICRO-NANO OPTICAL ANALOG COMPUTING DEVICE", which is incorporated herein by reference in its entirety.

TECHNICAL FIELD

The present invention relates to the technical field of optical analog computing, and specifically, provides a planar micro-nano optical analog computing device.

BACKGROUND

Geometric features of a target object in an image are the most intuitive information that embodies a type of the target object. It is of great significance to perform selective imaging or processing on different target objects through the geometric features in the fields of target recognition and the like. Image edge information is a position where the brightness changes sharply or is discontinuous in the image, which contains the key information of the geometric features of the target object in the image. Edge information extraction on the image can retain important features of the target object and reduce the amount of data information, which is an important part of machine vision and computer vision. In addition, processes of image capture, compression, and transmission may cause image noise, resulting in information loss and irregular and erroneous information in real-time applications such as computer photography, obstacle detection, traffic monitoring, and automatic character recognition. Therefore, image denoising is also an important part of an image processing technology. In the fields of biomedical imaging and the like, different types of to-be-measured targets (such as tissues or cells) have different sizes. Selective edge extraction on target objects with different structural sizes such as different types of cells can enhance target edge information intensity, and denoising processing on the image can also enhance an image signal-to-noise ratio, which are both helpful to recognize and sort the target objects more effectively. Based on a planar micro-nano optical element, required transfer functions at different wavelengths are designed, so that a wavelength-controlled two-dimensional multi-channel image optical analog computing device with a high numerical aperture and insensitive polarization can be implemented, and differential image processing can be performed on the target objects with different structural sizes selectively. Therefore, it is of great significance to implement a multi-functional image processing device that can perform differential image processing on the target objects.

The image is composed of spatial frequency information ranging from a low frequency to a high frequency. A plurality of image processing effects can be implemented by modulating these high/low spatial frequencies. For example, image denoising and edge extraction can be implemented respectively by blocking the high frequency while allowing the low frequency or allowing the high frequency while blocking the low frequency. Traditional image processing technology is based on an electrical method, which requires a computer to convert image information into a digital signal. However, this method is limited by computer speed, requires high energy consumption, and cannot meet real-time and low-energy requirements of emerging fields such as autonomous driving. In recent years, an optical analog computing method has been widely concerned. This method can directly process an optical signal and implement fast and parallel computing, and energy consumption can be ignored. Traditional optical analog computing implements image edge extraction and denoising based on a method of Fourier optics. High-frequency edge information and noise information can be extracted or filtered out by adding a mask to a Fourier surface of a 4f system to filter low/high wave vector components of incident light. However, a Fourier optical system requires various optical elements and has problems such as a large shape size, poor integration, and difficult compatibility with a compact imaging system.

In recent years, nanophotonics has developed rapidly. A plurality of new functions that are difficult to implement with a traditional optical element can be implemented by controlling the propagation of light on a sub-wavelength thickness micro-nano structure, ushering new possibilities to the field of optical analog computing. In existing work, the device has specific angle sensitivity by designing geometric sizes of structures such as a thin film, a metasurface, a photonic crystal, or an optical grating, to obtain high/low-pass transfer functions, so that image spatial filtering is directly implemented without Fourier transform, thereby implementing the image edge extraction and denoising. However, the existing work is implemented in a manner of optical high/low-frequency filtering, which can only perform the same processing on all target objects larger than a certain size standard and does not have an ability of size distinguishing. In addition, most of the existing work only has a single modulation function with a limited numerical aperture, low resolution, and high integration and processing difficulty. Different from previous work, a bandpass filtering transfer function modulation method of a frequency domain space is first proposed herein. Bandpass filtering is performed on frequency information in different size ranges in an image frequency domain space by implementing bandpass filtering transfer functions with different frequency ranges at different wavebands, thereby controlling the size of a target on which edge extraction or denoising image processing is performed. According to the device, an image processing function with size range selectivity can be implemented, and a multi-functional optical analog computing device with multi-channel, miniaturized, and integrated characteristics can be implemented.

SUMMARY

In view of the above problems, the present invention provides a planar micro-nano optical analog computing device, and structural design is performed based on a planar micro-nano optical element, so that selective image processing is implemented in different channels, thereby implementing a new image processing function and reducing integration and processing difficulty.

According to the planar micro-nano optical analog computing device provided in the present invention, the planar micro-nano optical element includes a micro-nano structure. By adjusting a physical parameter of the micro-nano structure, the planar micro-nano optical element corresponds to different transfer functions at different resonance wavelengths, and a relationship curve between the transfer function and an incident wave vector at different resonance wavelengths is rectangle bandpass filtering functions with different bandwidths.

Preferably, the planar micro-nano optical element adopts any one or more of a metasurface, a photonic crystal, a film structure, and an optical grating.

Preferably, a multi-layer micro-nano structure constitutes an effective medium unit, the effective medium unit includes a metal layer, a medium layer, and a metal layer in sequence, and an effective refractive index $n_{eff}$ of the effective medium unit is:

$$n_{eff} = \sqrt{\frac{\sin 2\delta_M \cos n_D + \frac{1}{2}\left(\frac{n_M}{n_D} + \frac{n_M}{n_D}\right)\cos 2\delta_M \sin\delta_D - \frac{1}{2}\left(\frac{n_M}{n_D} - \frac{n_D}{n_M}\right)\sin\delta_D}{\sin 2\delta_M \cos n_D + \frac{1}{2}\left(\frac{n_M}{n_D} + \frac{n_M}{n_D}\right)\cos 2\delta_M \sin\delta_D + \frac{1}{2}\left(\frac{n_M}{n_D} - \frac{n_D}{n_M}\right)\sin\delta_D} n_M^2},$$

where $n_M$ represents a refractive index of the metal layer, including a real part and an imaginary part; and $n_D$ represents a real part refractive index of a material of the medium layer;

$\delta_M$ represents a phase thickness of the metal layer, $$\delta_M = \frac{2\pi}{\lambda} n_M d_M \sqrt{1 - \sin\theta^2},$$

θ represents an incident angle, λ represents an incident wavelength, and $d_M$ represents a thickness of the metal layer; and $\delta_D$ represents a phase thickness of the medium layer, $$\delta_D = \frac{2\pi}{\lambda} n_D d_D \sqrt{1 - \sin\theta^2},$$

and $d_D$ represents a thickness of the medium layer.

Preferably, the effective medium unit further includes a substrate disposed on a bottom layer.

Preferably, a real part of a material refractive index of the metal layer is 0, and an imaginary part thereof ranges from 2 to 5.

Preferably, the physical parameter that can be adjusted of the micro-nanostructure includes: a dielectric constant, a geometric size, an arrangement manner, and an arrangement period.

Preferably, the transfer function includes a transmission transfer function and a reflection transfer function.

Preferably, the metal layer adopts any one or more of silver, gold, aluminum, doped semiconductor indium arsenide, and transparent conductor oxide aluminum-doped zinc oxide, and the medium layer adopts any one or more of magnesium fluoride, titanium dioxide, silicon dioxide, hafnium dioxide, silicon, silicon nitride, and aluminum oxide.

Preferably, the effective medium unit further includes an aluminum oxide layer disposed on a top layer.

Compared with the prior art, the present invention can achieve the following beneficial effects:

According to the present invention, based on the planar micro-nano optical element, required bandpass transfer functions at different wavelengths are designed, so that a wavelength-controlled two-dimensional multi-channel image optical analog computing device with a high numerical aperture and insensitive polarization can be implemented, and selective image processing can be performed on target objects with different structural sizes in the image. The present invention is a new-type multi-functional optical analog computing device with miniaturized and integrated characteristics.

An application waveband of the present invention is not limited to a material, and a proper material is selected to design the planar micro-nano optical analog computing device, so that a selective image of any required extreme-ultraviolet, ultraviolet, visible, infrared, and far infrared wavebands and the like can be processed.

BRIEF DESCRIPTION OF THE DRAWINGS

To describe the technical solutions in the present invention or in the prior art more clearly, the following briefly describes the accompanying drawings required for describing the embodiments or the prior art. Apparently, the accompanying drawings in the following description show merely some embodiments of the present invention, and those of ordinary skill in the art may derive other accompanying drawings from these accompanying drawings without creative efforts.

FIG. 1 is a planar micro-nano optical analog computing device according to an embodiment of the present invention;

Figure 2:
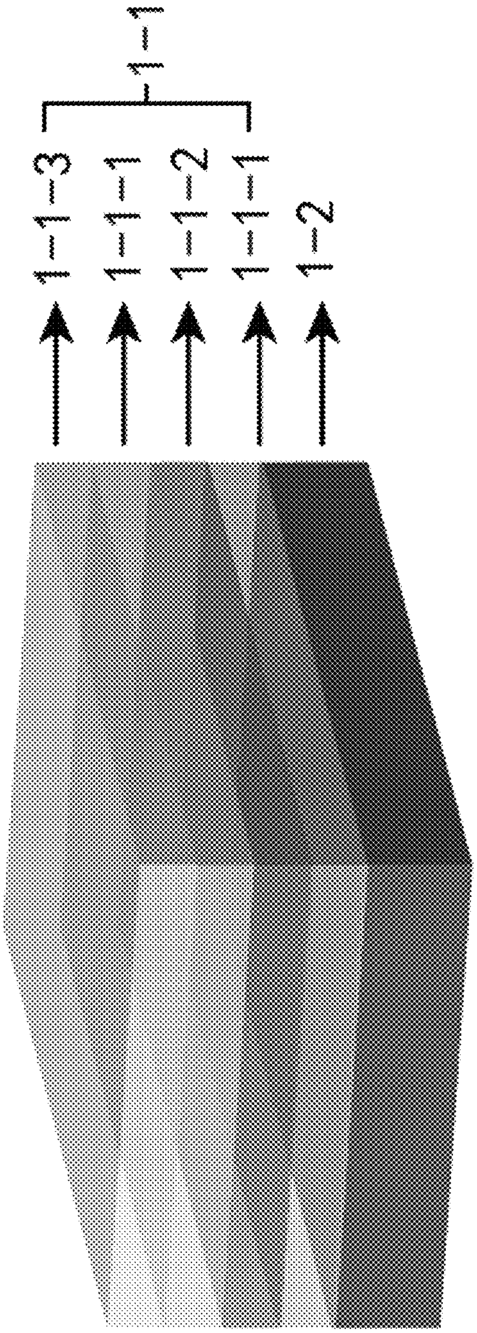
FIG. 2 is a structural distribution of a planar micro-nano optical analog computing device according to an embodiment of the present invention.

Reference numerals in the accompanying drawings:

planar micro-nano optical analog computing device 1; effective medium unit 1-1; metal layer 1-1-1; medium layer 1-1-2; aluminum oxide layer 1-1-3; substrate 1-2; light source 2; to-be-measured object 3; imaging lens 4; photodetector 5.

DETAILED DESCRIPTION OF THE EMBODIMENTS

To make the above purposes, features, and advantages of the present invention clearer and more comprehensible, the implementations of the present invention are described in detail below with reference to the accompanying drawings.

In the following description, specific details are illustrated in order to provide a thorough understanding of the present invention. However, the present invention can be implemented in a plurality of other manners different from those described herein, and a person skilled in the art can make similar inferences without departing from the connotation of the present invention. Therefore, the present invention is not limited to the specific implementations disclosed below.

As shown in FIG. 1, according to a planar micro-nano optical analog computing device according to an embodiment of the present invention, based on a relationship between emergent and incident electromagnetic fields, $E_{out}(x, y) \propto t(k_x, k_y) E_{in}(x, y)$, where $E_{in}(x, y)$ is an incident electric field, $E_{out}(x, y)$ is an emergent electric field, $t(k_x, k_y)$ is a transfer function, x and y are spatial positions, and $k_x$ and $k_y$ are wave vectors. A planar micro-nano optical element is designed, to generate a plurality of continuous angle-dependent strong resonances in a wide waveband, thereby performing multi-resolution image edge extraction and multi-functional modulation of image denoising on images at different wavelengths. The planar micro-nano optical element may adopt any one or more of micro-nano structures such as a metasurface, a photonic crystal, a film structure, and an optical grating.

An effective medium unit 1-1 and a substrate 1-2 are disposed in the planar micro-nano optical element. The effective medium unit 1-1 is composed of a multi-layer micro-nano structure, and a physical parameter such as a dielectric constant, a geometric size, an arrangement manner, and an arrangement period of the multi-layer micro-nano structure is adjusted, so that the effective medium unit 1-1 corresponds to different transfer functions at different resonance wavelengths, and a relationship curve between a transmission or reflection transfer function and an incident wave vector at different wavelength channels is rectangle bandpass filtering functions with different bandwidths. The rectangle bandpass filtering function includes but is not limited to:

$$t(k_x, k_y) \propto \begin{cases} 0.1 & \frac{k_{x\backslash y}}{k_0} < NA_1 \\ 1 & NA_1 < \frac{k_{x\backslash y}}{k_0} < NA_2 \\ 0.1 & NA_2 < \frac{k_{x\backslash y}}{k_0} < 1 \end{cases},$$

where $NA_1$ is a step-up numerical aperture of the transfer function, and $NA_2$ is a step-down numerical aperture. Specifically, scattering and phase correction of incident light by the micro-nano structure may be controlled by selecting a proper material and adjusting the dielectric constant of the micro-nano structure, and micro-nano structures with different dielectric constants may have different effects on light with different wavelengths; or/and transmission and reflection of a specific wavelength by the micro-nano structure may be adjusted and controlled by adjusting the geometric size (for example, a height, a width, and a period) of the micro-nano structure, and the device may implement different transfer functions at a plurality of resonance wavelengths by optimizing the geometric size; or/and different arrangement manners and arrangement periods (for example, ordered arrangement and random arrangement) of the micro-nano structure may affect a periodic response and a scattering characteristic of a medium, and filtering effects of different wavelength channels are implemented by optimizing the arrangement manner. In addition, the planar micro-nano optical element may adopt the metasurface. A physical parameter such as a dielectric constant, a geometric size, an arrangement manner, and an arrangement period of a metasurface micro-nano structure is designed, so that the metasurface corresponds to different transfer functions at different resonance wavelengths, and a relationship curve between a transmission or reflection transfer function and an incident wave vector at different wavelength channels has a filtering effect similar to the above. The planar micro-nano optical element may adopt the photonic crystal. A physical parameter such as a dielectric constant, a geometric size, an arrangement manner, and an arrangement period of a photonic crystal micro-nano structure is designed, so that the photonic crystal corresponds to different transfer functions at different resonance wavelengths, and a relationship curve between a transmission or reflection transfer function and an incident wave vector at different wavelength channels has a filtering effect similar to the above. The planar micro-nano optical element may adopt a multi-layer or single-layer film structure. A physical parameter such as a dielectric constant, a geometric size, an arrangement manner, and an arrangement period of the film structure is adjusted, so that the film structure corresponds to different transfer functions at different resonance wavelengths, and a relationship curve between a transmission or reflection transfer function and an incident wave vector at different wavelength channels has a filtering effect similar to the above. The planar micro-nano optical element may adopt the optical grating. A physical parameter such as a dielectric constant, a geometric size, an arrangement manner, and an arrangement period of an optical grating structure is adjusted, so that the optical grating structure corresponds to different transfer functions at different resonance wavelengths, and a relationship curve between a transmission or reflection transfer function and an incident wave vector at different wavelength channels has a filtering effect similar to the above.

As shown in FIG. 2, the effective medium unit 1-1 adopts an MDM structure to implement multi-size selective image edge extraction and denoising processing, and specifically includes a metal layer 1-1-1, a medium layer 1-1-2, and a metal layer 1-1-1 from top to bottom in sequence. In the structure, a phase thickness of the metal layer 1-1-1 is:

$$\delta_M = \frac{2\pi}{\lambda} n_M d_M \sqrt{1 - \sin\theta^2},$$

where θ represents an incident angle, λ represents an incident wavelength, and $d_M$ represents a thickness of the metal layer 1-1-1.

A phase thickness of the medium layer 1-1-2 is:

$$\delta_D = \frac{2\pi}{\lambda} n_D d_D \sqrt{1 - \sin\theta^2},$$

where $d_D$ represents a thickness of the medium layer.

The phase thickness of the metal layer 1-1-1 and the phase thickness of the medium layer 1-1-2 meet a matching condition, and a transmission coefficient reaches a peak value. When a value of an effective refractive index of the effective medium unit 1-1 is close to 0, the transmission coefficient may have a plurality of peak values in a wide waveband, that is, a plurality of continuous incident angle-dependent high-transmissivity spectral lines may be generated in a wide waveband range.

The effective refractive index $n_{eff}$ of the effective medium unit 1-1 is related to a specific refractive index and thickness of each layer and specifically is:

$$n_{eff} = \sqrt{\frac{\sin 2\delta_M \cos n_D + \frac{1}{2}\left(\frac{n_M}{n_D} + \frac{n_M}{n_D}\right)\cos 2\delta_M \sin\delta_D - \frac{1}{3}\left(\frac{n_M}{n_D} - \frac{n_D}{n_M}\right)\sin\delta_D}{\sin 2\delta_M \cos n_D + \frac{1}{2}\left(\frac{n_M}{n_D} + \frac{n_M}{n_D}\right)\cos 2\delta_M \sin\delta_D + \frac{1}{2}\left(\frac{n_M}{n_D} - \frac{n_D}{n_M}\right)\sin\delta_D} n_M^2},$$

where $n_M$ represents a refractive index of the metal layer 1-1-1 and is a plural, including a real part and an imaginary part; and $n_D$ represents a real part refractive index of a material of the medium layer 1-1-2.

According to the above conditions, the metal layer 1-1-1 may adopt any one of metal, alloy, or other materials meeting a refractive index with a real part being 0 and an imaginary part ranging from 2 to 5, for example, metal gold, silver, and aluminum, doped semiconductor indium arsenide, and transparent conductor oxide aluminum-doped zinc oxide. The medium layer 1-1-2 may adopt any one or more of magnesium fluoride, titanium dioxide, silicon dioxide, hafnium dioxide, silicon, silicon nitride, and aluminum oxide.

In the embodiment, the metal layer 1-1-1 adopts a metal material silver (Ag) with a refractive index with a low real part and a high imaginary part. The medium layer 1-1-2 adopts a medium material magnesium fluoride (MgF2) with a refractive index similar to that of a vacuum. In addition, an aluminum oxide layer 1-1-3 is further disposed on the metal layer 1-1-1 that is on the top-most layer. The aluminum oxide may effectively assist phase compensation, reduce reflection, and also prevent the silver on the top-most layer from being oxidized. The substrate 1-2 adopts fused silica.

Figure 3:
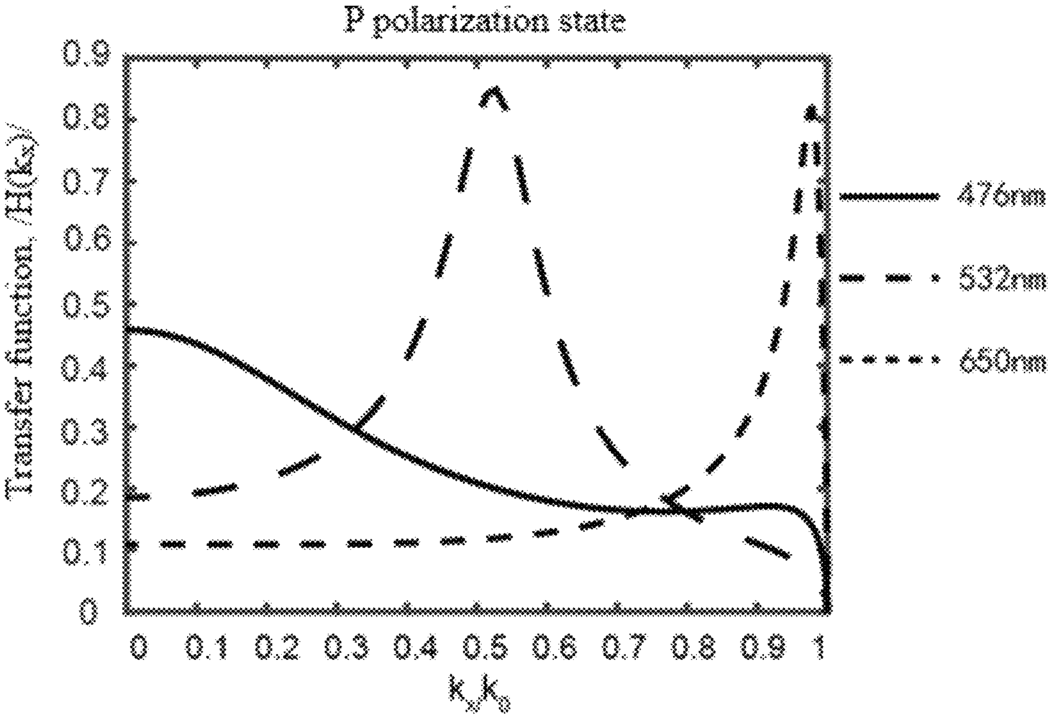
FIG. 3 is a simulation result of a transmission coefficient transfer function at different wavelengths and a p polarization state according to an embodiment of the present invention.
Figure 4:
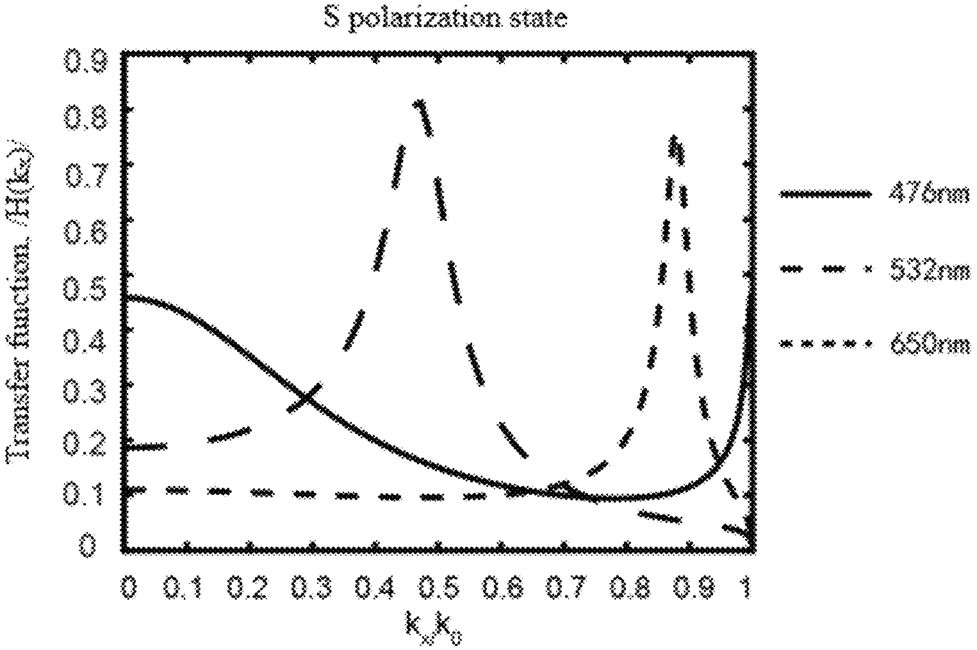
FIG. 4 is a simulation result of a transmission coefficient transfer function at different wavelengths and an s polarization state according to an embodiment of the present invention.

As shown in FIG. 3 and FIG. 4, a planar micro-nano optical analog computing device 1 with the above parameters is simulated, to obtain a transmission coefficient transfer function at different wavelengths and polarization states.

A working waveband is 476 nm, and in a range of 0.85 numerical aperture (NA), for s polarized light and p polarized light, a transfer function curve directly proportional to a rectangle bandpass filtering function is implemented, indicating that image denoising processing is implemented.

Working wavebands are 532 nm and 650 nm, and in ranges of 0.93 to 0.99 and 0.43 to 0.6 numerical apertures (NA), for s polarized light and p polarized light, a transfer function curve directly proportional to a rectangle bandpass filtering function is implemented, indicating that edge extraction processing on different sizes of target objects is implemented.

Based on a resolution formula $$\frac{0.61\lambda}{NA},$$

image edge extraction processing in ranges of 327 nm to 348 nm resolution and 660 nm to 922 nm resolution may be implemented respectively at two working wavebands of 532 nm and 650 nm, and image denoising processing of 342 nm resolution may be implemented at the working band of 476 nm.

Figure 5:
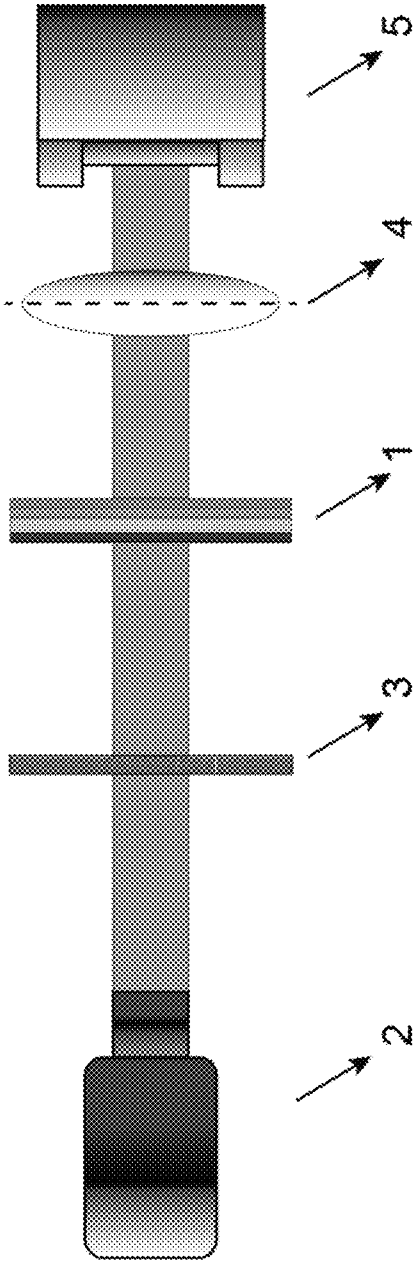
FIG. 5 is a schematic diagram of a light path of an application system of a planar micro-nano optical analog computing device according to an embodiment of the present invention.

As shown in FIG. 5, the planar micro-nano optical analog computing device 1 is used to build an imaging system and shows a specific application light path. The system includes the planar micro-nano optical analog computing device 1, a light source 2, a to-be-measured object 3, an imaging lens 4, and a photodetector 5, where the light source 2 adopts a laser with a working wavelength ranging from visible light to an infrared waveband and another light source. In the embodiment of the present invention, the light source 2 is a super-continuum laser with working wavelengths being 476 nm, 532 nm, and 650 nm. The planar micro-nano optical analog computing device 1 may move arbitrarily along three spatial axial directions and does not need to be placed accurately. After the emitted light of the light source 2 passes through the to-be-measured object 3 and the planar micro-nano optical analog computing device 1, edge information of different sizes of to-be-measured objects can be obtained on the photodetector 5 through the imaging lens 4. At different working wavebands, structural selective edge extraction and denoising imaging functions can be implemented. In addition, a design of the planar micro-nano optical analog computing device 1 may be changed to process a selective image in any extreme-ultraviolet, ultraviolet, visible, infrared, and far infrared working wavebands and the like.

Figure 6:
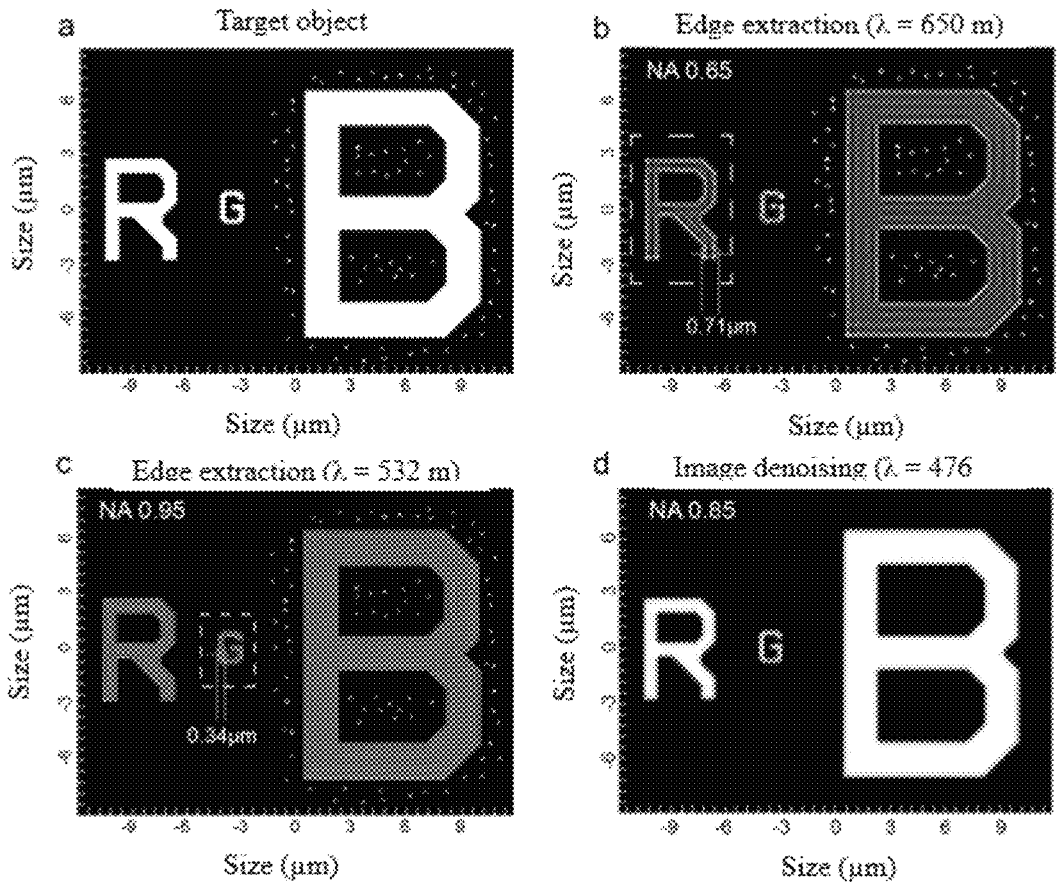
FIG. 6 is a schematic diagram of an imaging effect in which a planar micro-nano optical analog computing device performs selective edge extraction and denoising processing on different size structures according to an embodiment of the present invention.

As shown in FIG. 6, different sizes of target objects R, G, and B (a in FIG. 5) are simulated according to the above system at different incident wavelengths. For example, b in FIG. 5: selective edge extraction with NA=0.65 is implemented when an incident wavelength λ=650, and a letter R that is selectively extracted is in a dashed box; c in FIG. 5: selective edge extraction with NA=0.95 is implemented when an incident wavelength λ=532, and a letter G that is selectively extracted is in a dashed box; and d in FIG. 5: image denoising with NA=0.85 is implemented when an incident wavelength λ=476, and a denoising target is a letter B.

According to the present invention, design is performed based on the planar micro-nano optical element, which not only reduces integration and processing difficulty and improves image extraction resolution, but also implements a plurality of functions of edge extraction, image denoising, and the like.

Various embodiments in the specification are described in a progressive manner, and each embodiment focuses on the differences from the other embodiments, and the same or similar parts between the various embodiments can refer to each other.

The above description of the disclosed embodiments enables a person skilled in the art to implement or use the present invention. Various modifications to these embodiments will be readily apparent to a person skilled in the art, and the generic principles defined herein may be implemented in other embodiments without departing from the spirit or scope of the present invention. Therefore, the present invention is not intended to be limited to the embodiments shown herein, but is to be in accordance with the widest scope consistent with the principles and novel features disclosed herein.

What is claimed is:

1. A planar micro-nano optical analog computing device, wherein a planar micro-nano optical element comprises a micro-nano structure, and a physical parameter of the micro-nano structure is adjusted, so that the planar micro-nano optical element corresponds to different transfer functions at different resonance wavelengths, and a relationship curve between the transfer function and an incident wave vector at different resonance wavelengths is rectangle bandpass filtering functions with different bandwidths; and a multi-layer micro-nano structure constitutes an effective medium unit, the effective medium unit comprises a metal layer, a medium layer, and a metal layer in sequence, and an effective refractive index $n_{eff}$ of the effective medium unit is:

$$n_{eff} = \sqrt{\frac{\sin 2\delta_M \cos n_D + \frac{1}{2}\left(\frac{n_M}{n_D} + \frac{n_M}{n_D}\right)\cos 2\delta_M \sin\delta_D - \frac{1}{3}\left(\frac{n_M}{n_D} - \frac{n_D}{n_M}\right)\sin\delta_D}{\sin 2\delta_M \cos n_D + \frac{1}{2}\left(\frac{n_M}{n_D} + \frac{n_M}{n_D}\right)\cos 2\delta_M \sin\delta_D + \frac{1}{2}\left(\frac{n_M}{n_D} - \frac{n_D}{n_M}\right)\sin\delta_D} n_M^2},$$

wherein $n_M$ represents a refractive index of the metal layer, comprising a real part and an imaginary part; and $n_D$ represents a real part refractive index of a material of the medium layer;

$\delta_M$ represents a phase thickness of the metal layer, $$\delta_M = \frac{2\pi}{\lambda} n_M d_M \sqrt{1 - \sin\theta^2},$$

θ represents an incident angle, λ represents an incident wavelength, and $d_M$ represents a thickness of the metal layer; and $\delta_D$ represents a phase thickness of the medium layer, $$\delta_D = \frac{2\pi}{\lambda} n_D d_D \sqrt{1 - \sin\theta^2},$$

and $d_D$ represents a thickness of the medium layer.

2. The planar micro-nano optical analog computing device according to claim 1, wherein the effective medium unit further comprises a substrate disposed on a bottom layer.

3. The planar micro-nano optical analog computing device according to claim 1, wherein a real part of a material refractive index of the metal layer is 0, and an imaginary part thereof ranges from 2 to 5.

4. The planar micro-nano optical analog computing device according to claim 1, wherein the physical parameter that can be adjusted of the micro-nano structure comprises: a dielectric constant, a geometric size, an arrangement manner, and an arrangement period.

5. The planar micro-nano optical analog computing device according to claim 1, wherein the transfer function comprises a transmission transfer function and a reflection transfer function.

6. The planar micro-nano optical analog computing device according to claim 3, wherein the metal layer adopts silver, gold, or aluminum, and the medium layer adopts any one or more of magnesium fluoride, titanium dioxide, silicon dioxide, hafnium dioxide, silicon, silicon nitride, and aluminum oxide.

7. The planar micro-nano optical analog computing device according to claim 6, wherein the effective medium unit further comprises an aluminum oxide layer disposed on a top layer.

8. The planar micro-nano optical analog computing device according to claim 1, wherein the planar micro-nano optical element adopts any one or more of a metasurface, a photonic crystal, a film structure, and an optical grating.

* * * * *